Figure 1:
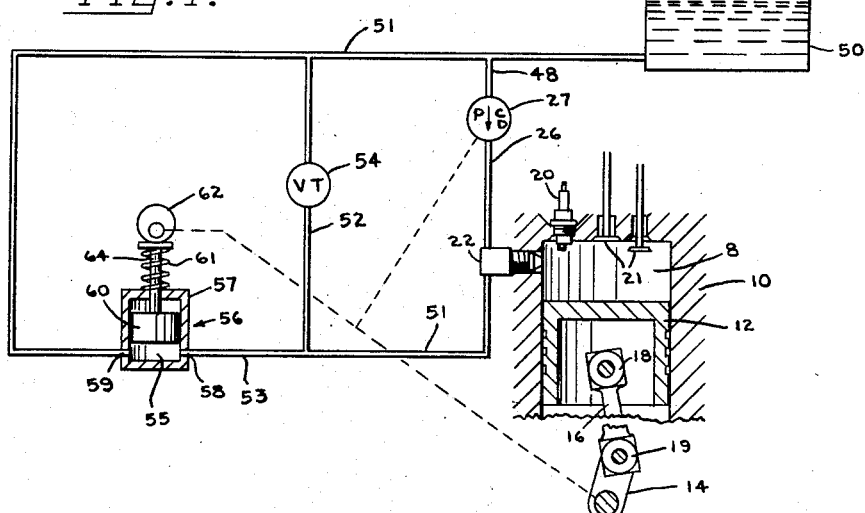

Jan. 15, 1957   C. D. MacCRACKEN   2,777,433
INTERMITTENT FUEL INJECTION SYSTEM
Filed Jan. 8, 1952   2 Sheets-Sheet 1

INVENTOR.
CALVIN D. MacCRACKEN.
BY James M. Relph
ATTORNEY.

Jan. 15, 1957 — C. D. MacCRACKEN — 2,777,433
INTERMITTENT FUEL INJECTION SYSTEM
Filed Jan. 8, 1952 — 2 Sheets-Sheet 2
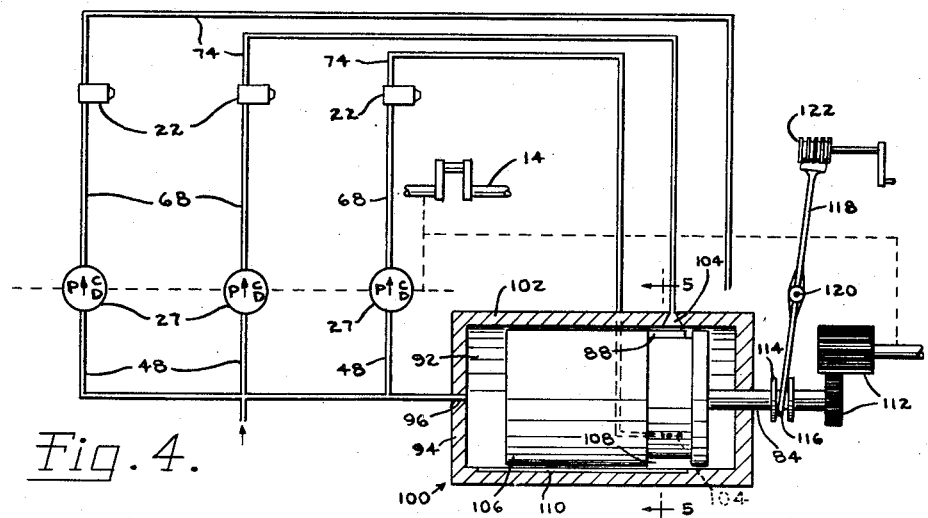
Fig. 4.
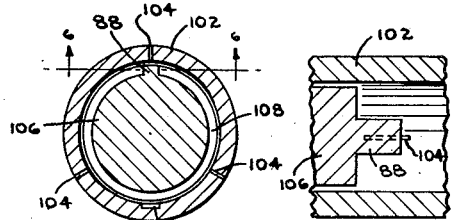
Fig. 5. Fig. 6A. Fig. 6C.
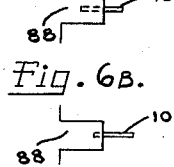
Fig. 6B.
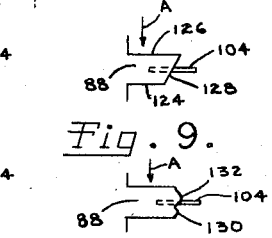
Fig. 9.
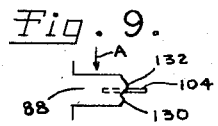
Fig. 10.
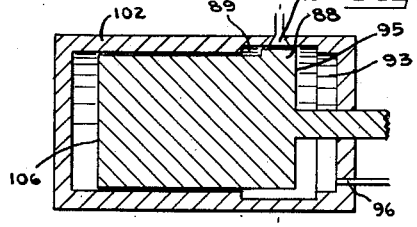
Fig. 7.
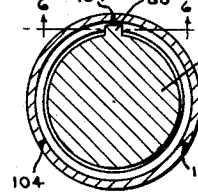
Fig. 8.
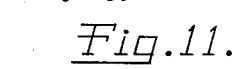
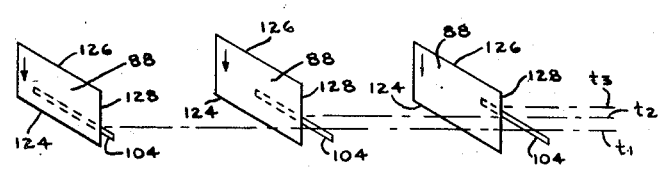
Fig. 13A. Fig. 13B. Fig. 13C.
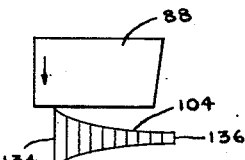
Fig. 12.
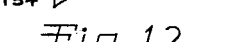
INVENTOR.
CALVIN D. MACCRACKEN.
BY James M. Relph
ATTORNEY.
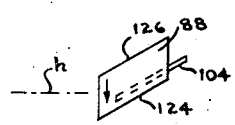
Fig. 14.
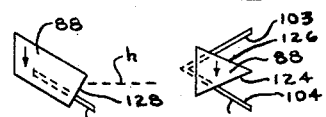
Fig. 15. Fig. 16.

United States Patent Office 2,777,433
Patented Jan. 15, 1957

2,777,433

INTERMITTENT FUEL INJECTION SYSTEM

Calvin D. MacCracken, Tenafly, N. J., assignor to Jet-Heet, Inc., Englewood, N. J., a corporation of New York Application January 8, 1952, Serial No. 265,507

17 Claims. (Cl. 123—139)

This invention relates to improvements in fuel supply systems for liquid fuel burning engines, and while not limited thereto finds particular application in and will be described with special reference to fuel supply systems for internal combustion engines.

As is well known, the usual internal combustion engine burns a mixture of air and finely divided particles of fuel. In the injection type of fuel supply system, liquid fuel is delivered to atomizing nozzles under considerable pressure, to cause the fuel to spray out of the nozzles and become mixed with a suitable quantity of air for proper combustion. It is customary to inject the fuel directly into the engine combustion chambers or cylinders for a short time near the end of the compression stroke of each piston. In other words, the fuel injection is intermittent, with carefully regulated amounts of fuel being injected into each cylinder at critical recurring times and at definite rates. Each injection usually takes place at an instant when the pressure in the combustion chamber is relatively high, say, between 300 and 500 p. s. i. Since good atomization of the injected fuel requires relatively high injection velocity, a substantial difference between the injected fuel pressure and the combustion chamber pressure is required. It follows, therefore, that a fuel injection system must be a relatively high pressure system.

The usual fuel injection system comprises a pump for supplying the fuel to be injected, and injection nozzles opening into the combustion chambers and connected to the pump through valves that are intermittently opened and closed, either mechanically or automatically in response to pressure changes. Alternatively, valving can be done in the pump itself. In either case, the valving operation is difficult to engineer in view of the critical timing and metering requirements involved and the high fuel supply pressure. Ths is particularly true if the system is made sufficiently flexible to meet the varying requirements frequently imposed on internal combustion engines, such as wide speed variation, wide variation in load at constant speed, and the lke.

A specific aspect of the metering problem is that of having a nozzle with a fuel outlet orifice small enough to provide for minimum fuel delivery when such is required, and yet a nozzle that will not clog. Ideally, a variable orifice nozzle probably would provide the best solution to the whole valving and metering problem, but the design of such a nozzle is practically precluded by other characteristics of the system and structural difficulties.

It is a general object of the present invention to provide an improved fuel injection system that will simulate in operation a system having variable orifice injection nozzles. More specifically, it is an object of the invention to provide an intermittent fuel injection system that is adapted to inject precisely regulated yet variable amounts of fuel into the combustion chamber or chambers of an engine, and at readily controllable and easily variable time intervals. A further object of the invention is to provide an intermittent fuel injection system wherein the fuel delivery can be made as small as desired but in which the fuel nozzled discharge orifice can be large enough practically to preclude clogging.

Yet another object of the invention is the provision of a fuel injection system having a minimum number of moving parts and a minimum number of precision machined parts, as well as a system that is economical to manufacture and inexpensive to maintain.

A further object of the invention is the provision of an improved flow control valve.

In accordance with the invention, the foregoing and other related objects and advantages are attended in a fuel supply system wherein there is maintained a substantially constant flow of fuel to one or more injection nozzles, and wherein intermittent injection (i. e., discharge from the nozzles) is accomplished by separately feeding back from the nozzles to the supply source varying amounts of the fuel flowing to the nozzles. In other words, the present invention contemplates and its practice provides a fuel supply system having "return flow" type nozzles, wherein the normal return flow from the nozzles is equal to the supply flow to the nozzles, and wherein valving means are provided to intermittently decrease the return flow in order to cause injection discharges from the nozzles. As will be explained more fully hereinafter, such an arrangement has numerous advantages as compared with a system wherein the flow of fuel to the nozzles is intermittently varied between zero and some relatively large amount for very short intervals of time.

Figure 2:
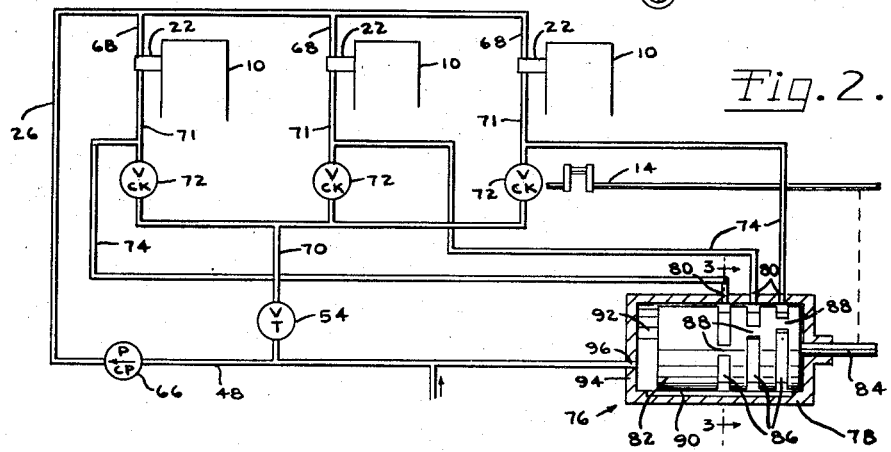
Figure 1A:
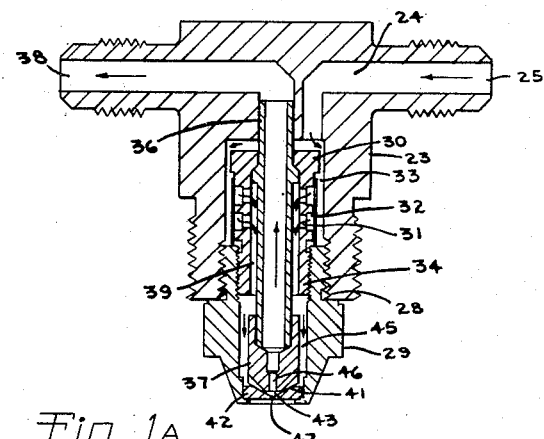
Figure 3:
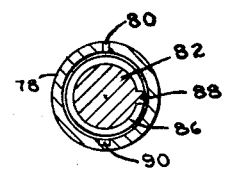

A more complete understanding of the invention can be had by reference to the following description of illustrative embodiments thereof, when considered in connection with the accompanying drawings, wherein Fig. 1 is a schematic diagram of a fuel supply system arranged in accordance with the invention to inject fuel into one cylinder of an internal combustion engine, Fig. 1a is a cross sectional view of a return flow nozzle suitable for use in the fuel supply system of the present invention, Fig. 2 is a schematic diagram similar to Fig. 1 but showing a novel return flow control system connected in accordance with the invention to control fuel flow to three of the cylinders of an internal combustion engine, Fig. 3 is an end view of the intermittent flow control valve of Fig. 2, taken on the line 3—3 of Fig. 2, Fig. 4 shows a further modification of the invention, wherein throttling and intermittent injection are accomplished with a single valving structure, Fig. 5 is an end section view of the valve shown in Fig. 4, taken on the line 5—5 of Fig. 4, Figs. 6a–6c are expanded views of a portion of the valving structure of Figs. 4 and 5, taken on the line 6—6 of Fig. 4, showing three different operational conditions of the valve, Fig. 7 is a longitudinal section of a further modified form of control valve, Fig. 8 is an end section view of the valve of Fig. 7, taken on the line 8—8 of Fig. 7, and Figs. 9–10 are views similar to Figs. 6a–6c, showing modifications of the valving structures of Figs. 4 and 5 and/or Figs. 7 and 8.

In the embodiment of the invention illustrated in Fig. 1, a system is provided for intermittently injecting fuel into the combustion space 8 inside one of the cylinders 10 of an internal combustion engine. A single cylinder has been shown in illustrating this embodiment of the invention for the sake of simplicity, although it will be understood that the principles involved are equally applicable to a plurality of cylinders. Only those parts of the engine are shown that are necessary to an understanding of the invention.

Inside the cylinder 10, there is provided the usual reciprocating piston 12 for delivering mechanical energy through the medium of a crank shaft 14 which is coupled to the piston 12 by a connecting rod 16 and bearings 18, 19. A spark plug 20 also may be provided for igniting combustible fuel-air mixtures inside the cylinder 10, as in an engine of the type described in U. S. Patent 2,484,009 —Barber. In the case of a compression-ignition engine, such as a diesel engine, the spark plug 20 would not be required. The cylinder 10 also is provided with the usual air intake and exhaust valves 21.

An atomizing nozzle 22 is arranged to inject fuel into the combustion chamber 8 through the side of the cylinder 10. The location of the nozzle 22, of course, is not of particular importance as far as the present invention is concerned. The nozzle 22 is of the return flow type, and may, for example, be constructed as described in U. S. Patent 2,567,818—MacCracken. Briefly, as shown in detail in Fig. 1a, the nozzle 22 includes a housing 23 having a cavity 24 to receive fuel supplied through a port 25. The mouth of the cavity 24 at the lower end of the housing is internally threaded as indicated at 28 to receive the externally threaded end of a nozzle tip 29. A hollow bushing 30 is provided with holes 31 located in the bottom of lateral grooves 32. The outside diameter of the bushing 30 is made less than the diameter of the cavity 24 to provide a space 33 between the bushing and the cavity walls. At one end 34, the bushing 30 is externally threaded to receive the internally threaded end of the nozzle tip 29.

A return tube 36 extends through the inside of the bushing 30, from a fuel distributor 37 inside the nozzle tip 29 to a return flow port 38 in the housing 23. The outside diameter of the return tube 36 is made less than the inside diameter of the bushing 30 to leave a space 39 therebetween leading to the distributor 37.

The end of the distributor 37 opposite the return tube 36 has a frustro-conical surface which fits against the inner conical surface 41 of an orifice nib 42 to define between distributor and nib a conical whirling space 43 which communicates with the space 39 through tangential slots (not shown) in the distributor and through the space 45 between the distributor and the nozzle tip 29.

An axial passage 46 in the distributor 37 leads from the whirling space 43 to the return tube 36, while an orifice 47 in the nib provides a spray outlet from the nozzle. The diameter of the passage 46 is made much greater than that of the orifice 47, for a purpose to be explained presently.

In the fuel supply system of Fig. 1, a fuel supply pump 27 is connected by a supply line 48 to a fuel tank 50 to supply fuel under pressure to the nozzle 22 through a supply line 26. A constant delivery pump is deemed preferable in order that the fuel supply pressure can be maintained at a value substantially greater, by a fairly constant amount, than the varying pressure in the combustion chamber 8. In the usual case, the pump 27 will be mechanically coupled to be driven by some suitable linkage (not shown) from the engine crank-shaft 14. With such an arrangement, the pump output will be constant at any given engine speed.

From the nozzle 22, a fuel return line 51 is connected back to the intake side of the pump 27 through two separate flow control branches 52, 53 having flow control means 54, 56 inserted therein. In one branch 52, a normally open throttle valve 54 is provided that can be manually or otherwise controlled to vary the fuel flow through this branch 52. The valve 54 is referred to as a throttle valve since it is utilized to control the quantity of fuel injected through the nozzle 22 into the chamber 8, as will appear more fully hereinafter.

In the second return line branch 53, there is provided a second normally open valve 56 for controlling intermittent injection. Accordingly, the valve 56 is connected to be closed recurrently in synchronism with the rotation of the engine crank shaft 14. While the valve 56 can take any one of a number of different forms, further examples of which are given hereinafter, in Fig. 1 it has been shown for simplicity as comprising a casing 57 having inlet and outlet ports 58 and 59 therein, and having a valving member in the form of a piston 60 that is adapted to open and close a passageway 55 between the ports 58 and 59. The piston 60 normally is held upwardly by means of a spring 61, thereby ordinarily keeping the valve open. A cam 62 riding against the upper surface of a valve actuating member 64 is mechanically coupled to the crank shaft 14.

When the system of Fig. 1 is in operation, fuel will flow from the tank 50 through the line 48, the pump 27, the line 26, the port 25 (see Fig. 1a), the space 33, the holes 31, the fuel supply passage 39, and the distributor slots into the whirl space 43. From the whirl space 43, two alternate outlets are available for the fuel; the orifice 47 and the return flow passage 46. In general, it can be said that the nozzle 22 is a pressure sensitive device. This means that if the diameter and length of the return passage 46 and of the orifice 47 were identical, and if the effective pressure opposing fuel flow through the passage 46 and the orifice 47 were the same, substantially equal amounts of fuel would flow through both openings. Accordingly, in designing a fuel supply system in accordance with the present invention, one must take account of the fact that the pressure at the orifice 47, which is exposed to the combustion chamber 8, will vary from subatmospheric to, say, 500 or more p. s. i. For this reason, the diameter of the passage 46 is made much greater than that of the orifice 47; enough so that all of the fuel flowing into the whirl chamber 43 can flow out of the return passage 46 even if the return passage pressure is considerably higher than that at the orifice 47 (i. e., the combustion chamber pressure). With such an arrangement, as long as the valves 54 and 56 in Fig. 1 both are open, all of the fuel supplied by the pump 27 to the nozzle 22 will flow back through the return passage 46 and the return tube 36 in the nozzle 22, and then through the return lines 51, 52 and 53, so that there will be no fuel discharge from the nozzle 22. However, with the throttle valve 54 partially closed, each time that the valve 56 is actuated by the cam 52 to restrict the flow area of the passageway 55 in the return branch 53, the resulting increase in return flow pressure and decrease in the fuel return flow will cause injection of fuel from the orifice 47 into the combustion chamber 8.

For normal operation, of course, the system would be adjusted so that the engine would idle with the throttle valve 54 nearly fully open. In other words, there will be some injection each time the valve 56 closes, even though the valve 54 is nearly fully open. As the throttle valve 54 gradually is closed, the return flow through the branch line 52 will be decreased, so that when the valve 50 is intermittently closed by the cam 52, larger and larger amounts of fuel will be injected into the combustion chamber 8. In this way, the amount of fuel injected can be increased or decreased as desired to accommodate changes in load on the engine or to vary the speed of operation thereof.

Since the return flow nozzle 22 is essentially a pressure sensitive device, as already stated, the return flow control means 54, 56 conceivably could comprise one or more hydraulic pressure actuated valves, rather than variable flow area mechanically actuated valves. However, the variable-area-passageway, mechanically actuated type valve is deemed preferable for rapid, precise control of fuel flow in view of the relatively high pressures and high frequency flow changes involved.

Although rather rudimentary in form, the fuel supply system shown in Fig. 1 will have many advantages over a "one way" fuel supply system wherein the fuel supply to the nozzle is periodically interrupted. One important advantage is in the fact that the valves 54, 56 need not be absolutely leakproof, since any fuel leaking past these valves will flow into the return line 51 on the suction side of the pump 27, rather than out of the nozzle 22 and, hence, will be of little consequence. Valve leakage in the "one way" system, of course, is serious because it upsets the fuel metering and fuel injection timing. Furthermore, compressibility of the fuel will not be a source of difficulty, as constantly flowing fuel only partially interrupted in its flow will not be subject to the large compression variations that are present in the normal "stop and go" operation of a one way fuel supply system, where the entire nozzle supply must be cut off and fully started very rapidly and frequently. A related advantage is that the fuel supply pressure can be lower. This is because considerable pressure is required to overcome the inertia of a motionless "slug" of fuel to make it move rapidly enough for proper atomization, over and above the fact that the supply pressure must exceed the combustion chamber pressure in order for injection to take place. In the system of the present invention, the fuel will already by moving rapidly in the whirl chamber 43 of the nozzle 22, and need only be diverted through the orifice 47. Again, the constant flow of fuel through the nozzle 22 will have a beneficial cooling effect thereon. Furthermore, the size of the nozzle outlet orifice 47 can be several times that of the orifice in a one way system because the orifice need not be restricted to meter the flow of fuel. In addition, particles large enough to clog the orifice 47 will easily pass through the passage 46, and usually will be washed out of the swirl chamber 43 even if they should temporarily cause clogging.

The specific apparatus shown in Fig. 1, does, however, have certain deficiencies as far as a multi-cylinder engine is concerned. For one thing, it would not be convenient to have individual throttle valves 54 for each of the engine cylinders. Again, the multiple valves and valve actuating mechanisms required would be relatively clumsy. In Fig. 2, there is shown a modification of the system of Fig. 1, wherein a single throttle valve is provided for a multi-cylinder arrangement, and wherein a single valving structure is provided for accomplishing the intermittent valving operation.

In the system of Fig. 2, a common supply line 26 leads from a constant high-pressure pump 66 to individual branch lines 68 communicating with separate nozzles 22 for a plurality of cylinders 10. Separate return lines 71 from the nozzles 22 lead through check valves 72 to a common line 70 which is connected through a throttle valve 54 to the intake line 48 leading to the pump 66. As in Fig. 1, the intake line 48 also connects the pump 66 to a fuel tank (not shown). Each of the return lines 71 also has a branch 74 connected to a valve structure 76.

As shown in Figs. 2 and 3, the valve structure 76 comprises a hollow cylindrical housing 78 having separate, longitudinally displaced ports 80 in the walls thereof communicating with the lines 74. Inside the elongated housing 78, a valving member 82 comprises a cylindrical piston mounted for rotation inside the housing 78 and adapted to be rotated in synchronism with the rotation of the engine crank shaft 14 through the medium of a driving shaft 84. The valving member 82 has a plurality of parallel grooves 86 extending laterally around the surface thereof and each aligned with one of the inlet ports 80.

Each of the grooves 86 is interrupted by a land 88 which constitutes a valve face in sliding engagement with the inner surface of the housing 78 and suitably dimensioned to close the port 80 adjacent thereto when the land passes the port during rotation of the member 82. Details of land and port configuration are given hereinafter in connection with Figs. 6 and 9–16. The housing 78 also has a groove 90 extending longitudinally along the inside wall thereof to connect the grooves 86 with a space 92 between the end of the valving member 82 and the housing end wall 94. An outlet port 96 in the housing end wall 94 is connected to the inlet line 48 leading to the suction side of the pump 66.

In the operation of the system shown in Fig. 2, the pump 66 will supply fuel at a constant and relatively high pressure to all of the nozzles 22. During the major portion of each rotation of the crank shaft 14 and of the valving member or piston 82, all of the fuel supplied to any one of the nozzles 22 will be returned to the intake side of the pump 66, partly through the associated check valve 72 and the throttle valve 54, and partly through the valving mechanism 76. However, each time that one of the lands 88 passes over its associated port 80, momentarily closing that port, the return flow from the corresponding nozzle 22 will be decreased, causing fuel to be injected from that nozzle into the associated cylinder. The injections to the individual cylinders 10 will be timed and sequenced by the relative location of the various lands 88 in the grooves 86. The throttle valve 54, of course, will act to meter the return flow pressure for all of the return lines 71.

In the system presently being described, a constant pressure pump is required rather than a constant displacement pump. In the system of Fig. 1, a constant displacement pump can be used because an increase in the pressure inside the cylinder 10 will cause a corresponding rise in fuel supply pressure, thereby maintaining the pressure difference required for injection. In the system of Fig. 2, however, each return line 71 in effect is a possible by-pass line for all nozzles except the one to which that particular return line is connected. Therefore, if a constant displacement pump were used in the Fig. 2 system, a pressure increase in any one of the cylinders 10 would not cause a corresponding increase in the fuel supply pressure, but would merely divert the fuel to nozzles in other cylinders wherein the pressure was lower. If, however, a pump is used that will supply fuel at a constant pressure, and if such constant pressure is higher than the maximum cylinder pressure, then the system will function in the intended manner. Constant pressure pump output can be obtained in well known ways, as by means of a suitable by-pass line around the pump and a constant pressure outlet valve, both usually incorporated in the pump assembly.

The check valves 72 also are required because of the possibility that the return lines 71 can act as by-pass lines. That is, without the check valves 72, shutting off one of the lines 74 by sweeping the land 88 over the associated port 80 might simply divert fuel to the other return lines 74 rather than causing injection to occur. The check valves 72 will prevent reverse flow through any of the branch lines 71 when a given one of the lands 88 passes over its associated port 80.

Thus, it can be seen that the system shown in Fig. 2 provides for single throttle valve control of all of the nozzles and also simplifies the intermittent valving of each of the nozzles 22.

While a single, constant-pressure pump feeding into a single supply line for all of the nozzles theoretically will be satisfactory in the fuel supply system of the present invention, as a practical matter such a pump arrangement involves problems that will be more or less serious depending on the type of engine with which the system is used. For one thing, considerable power would be needed in order to maintain the required constant high pressure. On the other hand, in the case of an internal combustion engine, high pressure is required for each nozzle only during a small part of each rotation of the engine crankshaft. For the rest of the time, relatively low pressure would be adequate to maintain fuel circulation. Furthermore, the required pressure will vary with the load on the engine. Accordingly, a constant pressure pump would have to be designed to work at a much higher pressure than would actually be required most of the time. For these reasons, it is believed that the use of individual constant displacement pumps for each of the nozzles is preferable to having a single constant pressure pump for all of the nozzles. Such an arrangement is shown in Fig. 4, which also illustrates a simplified and novel valving arrangement eliminating the separate throttle valve 54 used in the systems of Figs. 1 and 2.

In the system shown in Fig. 4, the cylinders of the engine have been omitted in order to simplify the drawing. The system of Fig. 4 includes a group of constant displacement pumps 27, such as gear pumps or the like, preferably all mounted on a common shaft driven from the engine crankshaft 14. Individual supply lines 68 lead from the pumps 27 to the nozzles 22, and return lines 74 lead from the nozzles 22 to a valving structure 100. As shown in Figs. 4 and 5, the valving structure 100 comprises a hollow cylindrical housing 102 having inlet ports 104 distributed circumferentially in the walls thereof. The ports 104 are laterally aligned, and open into the inside of the housing 102 as elongated slots parallel to the housing axis. Inside the housing 102, a cylindrical valving member or piston 106 is mounted both for rotation and for endwise movement. A groove 108 is provided in the wall of the piston 106 in communication with the inlet ports 104. A land 88 extends part way across this groove 108.

On the inside wall of the housing 102, a longitudinal groove 110 extends from the piston groove 108 to a space 92 between the end of the piston 106 and the end wall 94 of the housing 102. Return lines 48 are connected between a port 96 in the end wall 94 of the housing 102 and the intake side of the pumps 27, as well as to a fuel supply source (not shown).

In the system of Fig. 4, rotation of the piston 106 will bring the land 88 successively over each of the inlet ports 104, consecutively closing off those ports and thus sequentially raising the return line pressure for the nozzles 22 to cause fuel injection therefrom. By moving the valving member 106 longitudinally, the land 88 can be made to cover greater or smaller lengths of the inlet ports 104 as the land passes over the ports, thereby metering the fuel injection. To illustrate this action more clearly, there are shown in Figs. 6a—6c enlarged sectional views, taken on the line 6—6 of Fig. 5, of one of the ports 104 as the land 88 passes thereover, for three different relative longitudinal positions of the piston 106. In Figs. 6b—6c, in order to simplify the drawing, only the port 104 and land 88 are shown. In Fig. 6a, the longitudinal position of the piston 106 is such that the land 88 almost completely covers the port 104. This would correspond to minimum return flow for the particular nozzle involved, and, hence, maximum injection from that nozzle. In Fig. 6b, the port 104 and land 88 are shown displaced as though the piston 106 had been moved slightly to the left relative to its position in Fig. 6a. Accordingly, in the case illustrated by Fig. 6b, the land 88 covers somewhat less of the port 104 in passing thereover as the piston 106 rotates. As a result, the return flow from the nozzle involved will only be partially interrupted, causing a smaller amount of fuel to be injected from the nozzle. In Fig. 6c, the piston 106 has been moved still farther to the left so that the land 88 covers only a small portion of the port 104. This would correspond to minimum interruption of the return flow, and consequent minimum fuel injection, as when the engine is idling, for example. Thus, in the system of Figs. 4—6c, it can be seen that the valve 100 will serve both as a throttle valve and as an intermittent "pulsing" valve for causing fuel injection to take place.

There are, of course, a number of different ways in which the valving member 106 can be both rotated and moved endwise. For example, as is shown in Fig. 4, the drive shaft 84 for the valving member 106 can be coupled to the engine crank shaft 14 through gears 112, and can be provided with a collar 114 which is arranged to be engaged by the fingers 116 of a fork member 118 pivotally mounted at 120 to be moved back and forth by means of a worm gear 122. Other suitable arrangements for the mechanical control of the member 106 will readily suggest themselves to those skilled in the art.

The specific structure of the valving mechanisms 76 and 100 of Figs. 2 and 4 is, of course, subject to some variation within the scope of the invention. For example, as shown in Figs. 7 and 8, the piston groove 108 of Figs. 2–5 can be replaced by a groove 89 in the inner surface of the housing 102. In such case, the land 88 will comprise a projection on the surface of the piston member 106 extending into the groove 89. Similarly, the longitudinal groove 110 on the inner surface of the housing 102 in Figs. 4 and 5 (or the corresponding groove 90 in Figs. 2 and 3) can be eliminated by placing the outlet port 96 at the driving shaft end of the housing 102 and having the housing groove 89 communicate directly with the port 96 through a space 93 between the drive shaft end 95 of the piston 106 and the drive shaft end of the housing 102.

A further important feature of the fuel injection systems shown in Figs. 2 and 4 involves the shape of the land 88 and of the ports 104.

In many instances, it is extremely advantageous to have some provision in a fuel injection system for varying such parameters as the duration of each injection and the injection rate. For example, in some engines best performance is had by injecting a small quantity of fuel at the beginning of each injection in order to initiate combustion, and then increasing the quantity of fuel injected to support the main "power delivering" combustion. Again, in the case of the engine described in the above mentioned Barber patent, it is known that so-called temporal distribution of fuel, which is characterized by timing, rate and duration of injection, is an important factor in engine performance. Ability to control and vary injection readily with respect to timing, rate and duration is highly desirable. However, with conventional injection arrangements heretofore used, variations in injection timing, rate and duration have not been easy to achieve.

For the sake of concreteness, the following terms relating to the various parameters of fuel injection are used herein, for an internal combustion engine of the reciprocating piston type, with the indicated meanings:

*Injection duration.*—Number of degrees or radians of crankshaft rotation during which injection takes place;

*Injection rate.*—Absolute rate of fuel flow, in terms of gallons per hour, during each instant that injection is taking place;

*Injection quantity.*—The total amount of fuel injected per injection;

*Injection timing.*—The relative points in crankshaft rotation at which injection starts and stops (referred arbitrarily to "top dead center" of piston travel as "zero").

In general, it can be seen that the shapes, dimensions, and relative orientation of the land 88 and ports 104 will have an important bearing on the foregoing injection parameters in the systems of Figs. 3 and 4. Injection will start when the land 88 covers enough of a port 104 to build up adequate back pressure in the return line connected to that port, and will last as long as such portion of the port is covered. Therefore, it can be seen that the relative widths of the land 88 and of the ports 104 will have an important bearing on the injection duration. By making the width of the port 104 much less than that of the land, so that the time from first port and land contact to maximum port coverage is negligible by comparison with the time of maximum port coverage, injection duration can be made to depend primarily on land width. Therefore, a narrow port is deemed preferable as it allows the designer to adjust the injection duration by changing only one structural dimension. Furthermore, a relatively narrow port insures precise control of injection timing and duration by making the injections begin and end abruptly. Of course, the area of the ports 104 must be adequate to let all of the fuel delivered to the nozzles be fed back without injection. As has already been stated, the return flow nozzle essentially is a pressure sensitive device, and in order to insure against injection when the combustion chamber pressure is low, the return flow pressure should be at a minimum wherever injection is not required.

These two requirements—narrow ports, and adequate area ports, lead to the belief that the slot-like port is preferable for most applications.

In the valve structure shown in Figs. 4 and 5, the injection quantity is variable, as already explained. The injection duration is fixed, and will depend primarily on the width of the land 88 provided the width of the slot 104 is much less than that of the land 88. The injection rate is constant for any given quantity setting. The timing is fixed, and is determined by the keying of the shaft 84 to the crankshaft 14. This assumes, of course, that the ports 104 are symmetrically spaced. In Figs. 9–12 of the drawing, there are shown various arrangements for making "temporal distribution" variations in a comparatively simple way in a fuel injection system constructed in accordance with the present invention.

Since the particular features of the invention about to be described pertain primarily to the structure of the valving mechanism, complete systems are not shown in connection with the following discussion. Rather, only the land and port portions of the valving structures have been illustrated, similar to the showings of Figs. 6b and 6c, and can be considered as taken on the line 6—6 of Fig. 5 or Fig. 8, it being understood that the various fuel lines, the nozzles, the fuel pumps, and the complete valve structure will be arranged substantially in the same manner as is shown in Fig. 2 or Fig. 4.

The valving structure shown in Fig. 9 is designed to give a variation in injection rate during each injection. The land 88 has a trapezoidal shape, with the "leading" and "trailing" edges 124, 126 being of unequal length so that the end 128 is slanted outwardly from leading to trailing edge.

As the land 88 sweeps past the port 104, in the direction indicated by the arrow A, it can be seen that the portion of the port 104 covered by the land 88 will increase. This will progressively decrease the return flow through the port 104, and thereby will increase the nozzle discharge or injection rate from beginning to end of each injection. To reverse the effect, it would only be necessary to reverse the slope of the end 128 of the land, so that the land 88 would progressively uncover more of the port 104 as it sweeps thereover.

Since the slanted end 128 of the land 88 in Fig. 9 is flat, the injection rate variation will be linear. Of course, for a non-linear variation, the land end 128 could be given a curved surface. For example, as shown in Fig. 10, the land end can be shaped with two humps 130, 132. Such a configuration would give a small "spurt" of fuel near the beginning of each injection as the hump 130 passes the port 104, followed by a larger "spurt" during a latter part of the injection as the hump 132 passes the port. In this way, practically any desired injection rate curve can be obtained by suitably shaping the end 128 of the land 88.

In the structures of Figs. 9 and 10, as in Figs. 6a—6c, the quantity of fuel injected will depend on the longitudinal position of the piston 106 in the housing 102.

A point to be considered in connection with injection rate variation as illustrated in Figs. 9 and 10 has to do with the matter of percentage variation of injection rate. As the injection quantity is varied in the case of a variable injection rate structure, such as those of Figs. 9 and 10, the percentage variation of injection rate also will change if the port slot width is uniform. Consider, for example, the port and land configuration shown in Fig. 11, which is substantially identical with that shown in Fig. 9. For purposes of explanation, the length of the port 104 in Fig. 9 has been made ten times the width, and the port 104 is divided into ten equal parts or sections $a$–$j$. The end 128 of the land 88 has been slanted so that the difference in the lengths of the leading and trailing edges 124, 126 of the land is exactly equal to the length of each section $a$–$j$ of the port. The land 88 is shown in a position just prior to reaching the port 104.

Assume, first, as shown by the full lines in Fig. 11 that the piston 106 is set so that land coverage of the port 104 will start at the junction of the second and third port sections $b$, $c$, and will end at the junction of the first and second port sections $a$, $b$. In view of the dimensioning of the port sections, under certain conditions of injection pressure and nozzle design this would be a 50% change in the return flow or injection rate (i. e., during injection, the return flow would vary between two and one times minimum return flow).

Now assume a case, as shown by the broken line outline in Fig. 11, in which the piston 106 is set so that land coverage of the port 104 will start at the junction of the fourth and fifth port sections $d$, $e$, and end at the junction of the third and fourth port sections $c$, $d$. This would cause a 25% change in injection rate (i. e., during injection, the return flow would change from four to three times minimum return flow). It is quite conceivable that this difference in percentage change of injection rate would be objectionable under some circumstances. If so, it can easily be compensated for simply by tapering the port slot 104 rather than having the edges of the port slot parallel as they are in Fig. 11. This tapering is shown in Fig. 12, where the port slot is shown wider at the left end 134 than at the right end 136. In order to illustrate the tapering effect clearly, the difference in the widths at the ends of the slot is greatly exaggerated. To carry through the illustrative examples previously given in connection with Fig. 11, the slot in Fig. 12 again is divided into 10 equal sections $a$–$j$, and the taper is made such that the area of the sections increases as two to the exponent of the distance from the tapered end, where the unit of distance is the difference in the lengths of the leading and trailing edges. Now as the land 88 is moved to the left to obtain injection quantity variation, the percentage of injection rate variation will remain constant, assuming that area "$a$" is never closed.

For example, under the certain conditions of injection pressure and nozzle design considered above, in the case where port coverage starts at the junction of the second and third port sections $b$, $c$ and ends at the junction of the first and second port sections $a$, $b$, the return flow will vary between two and one times minimum return flow, or a 50 percent variation. In the case where port coverage starts at the junction of the fourth and fifth port sections $d$, $e$ and ends at the junction of the third and fourth port sections $c$, $d$, the return flow will vary between 8 and 4 times minimum return flow; again a 50 percent variation. Of course, it will be obvious that the required slot taper could be varied as required to obtain a variable percentage variation in injection rate if such is desired. Also, it will be understood that in the schematic representation of Fig. 12, the port slot curvature is not a true exponential curve.

In Figs. 13a–13c of the drawing, there is shown a port and land combination designed to provide for simultaneous variation of timing and of quantity of fuel injected. In this case, the port slot 104 is not parallel to the housing axis, which can be considered parallel to the broken lines $t_1$–$t_3$, but rather is at an angle thereto. The edges 124, 126 of the land are similarly slanted at a corresponding angle to the housing axis. The land end 128 is at right angles to the housing axis.

In Fig. 13a, the land 88 is shown almost completely covering the port 104 as it sweeps past. This would correspond to relatively high quantity injection, as already explained. With regard to timing, a broken line $t_1$ has been drawn from a point representing the initial contact between port and land.

In Fig. 13b, the land 88 is shown covering a smaller portion of the port 104, representing movement of the land to the left to decrease the fuel injection quantity. With regard to timing, it can be seen that the broken line $t_2$, representing initial contact between port and land, is displaced upwardly with respect to the line $t_1$. This clearly shows that the injection will begin and end at a relatively earlier time in the case represented by Fig. 13a than in the case represented by Fig. 13b. The same change in timing relationship is further illustrated by the upward displacement of the timing reference line $t_3$ in Fig. 13c for further leftward displacement of the land. Thus, with the land and port shapes and orientations illustrated by Figs. 13a–13c, it can be seen that the injection timing will be advanced as the injection quantity is decreased. By reversing the slope of the land edges 126, 128 and of the port slot 104 relative to the housing axis $h$, as shown in Fig. 14, this relationship between injection timing and injection quantity can be reversed i. e., timing advance will accompany a quantity increase).

In Fig. 15, the features of the structures of Figs. 9 and 13a–13c are combined to give variable timing and quantity in combination with varying rate. As shown, the land 88 and the port 104 are slanted relative to the housing axis $h$, and the end 128 of the land forms an acute angle with the housing axis. For movement of the land 88 in the direction indicated by the arrow A, the injection rate will increase during each injection. Also, as in the case of Figs. 13a–13c, the timing will be advanced as the injection quantity is decreased by moving the land to the left.

In the embodiment of the invention shown in Fig. 16, a further injection parameter is made variable in combination with timing and quantity variations; namely, injection duration. In this case, as the land 88 is moved to the left to decrease the injection quantity and retard the timing, the injection duration also will decrease. As shown, the land 88 is triangular in plan view, while the port 104 comprises a pair of angularly related slots 103, 105. The angle between the slots 103, 105 is the same as the angle between the land edges 124, 126. As the land sweeps over the port, the leading land edge 124 first will cover the upper slot 103. The moving land then will cover equally increasing and decreasing portions of the lower and upper slots 105, 103, respectively, and finally will pass abruptly off of the lower slot 105. Movement of the land to the left will retard the timing, and simultaneously decrease the injection duration.

It is thought that the foregoing examples will suffice to outline the basic principles involved and to show the flexibility of the valving structures of Figs. 2 and 3, Figs. 4 and 5, or Figs. 7 and 8, it being understood that principles involved are the same for either the multiple land and grooving structure of Figs. 2 and 3 or the single land and grooving structure of Figs. 4 and 5, and 6 and 7.

It can be seen that the present invention provides a simple and efficient fuel injection system that has many advantages as compared with the conventional one way fuel injection system, and a system that is capable of use in a variety of applications.

I claim:

1. In a fuel supply system for intermittently injecting fuel into a combustion chamber, in combination, an atomizing nozzle of the return flow type having fuel supply and fuel return lines connected thereto and having a discharge orifice opening into said combustion chamber and in continuous open communication inside said nozzle with both said lines, means to supply fuel to said nozzle continuously through said supply line, and valving means in said return line for cyclically varying the fuel flow through said return line from 100% of the amount of fuel flowing through said supply line to less than 100% of said amount.

2. In a fuel supply system, in combination, an atomizing nozzle of the return flow type having inlet and return flow passages and a fuel discharge orifice in continuous open communication with said passages, continuous-flow fuel supply means including a pump connected to said inlet passage to supply fuel to said nozzle, a fuel return system including said return flow passage arranged to conduct from said nozzle back to said supply means all of the fuel supplied by said pump to said nozzle, and valve means in said return system to cyclically decrease the fuel flow through said return system to cause cyclical fuel discharge from said orifice.

3. In a liquid supply system, in combination, an atomizing nozzle of the return flow type having inlet and return flow passages and a liquid discharge orifice communicating with said passages, liquid supply means including a continuous output pump connected to said inlet passage to supply liquid to said nozzle, a fuel return system including said return flow passage arranged to conduct liquid from said nozzle back to said supply means on the suction side of said pump, said return system being dimensioned and adapted to conduct away from said nozzle all of the liquid supplied to said nozzle, a normally open valve in said return system to control the flow of liquid through said return system, and means to partially intermittently close said valve to intermittently decrease the liquid flow through said return system and thereby cause intermittent liquid discharge from said orifice.

4. In a system for intermittently injecting liquid fuel into a combustion chamber of an internal combustion engine in synchronism with the rotation of the engine crankshaft, in combination, an atomizing nozzle of the return flow type having fuel supply and fuel return lines connected thereto and having a fuel discharge orifice communicating inside said nozzle with said lines, a normally open valve in said return line, and means coupling said valve to said crankshaft to intermittently partially close said valve in synchronism with the rotation of said crankshaft whereby to decrease the fuel flow through said return line and thereby cause intermittent discharge from said orifice.

5. In a system for intermittently injecting liquid fuel into a combustion chamber of an internal combustion engine in synchronism with the rotation of the engine crankshaft, in combination, an atomizing nozzle of the return flow type having a fuel inlet and alternative fuel outlets communicating with said inlet, one of said outlets comprising a fuel discharge orifice opening into said combustion chamber, the other of said outlets comprising a return flow passage, fuel supply means including a pump communicating with said inlet to supply fuel to said nozzle under pressure, a fuel return system including said return flow passage connecting said nozzle to said supply means on the suction side of said pump, said return system being dimensioned and adapted to conduct away from said nozzle all of the fuel supplied thereto through said inlet, a normally open valve in said return system, and means coupled to said crankshaft and to said valve to intermittently partially close said valve in synchronism with the rotation of said crankshaft.

6. In a system of the type defined in claim 5, means for selectively varying the extent of closure of said valve.

7. A system as defined in claim 6, wherein said valve and said selective varying means comprises a hollow elongated housing having an inlet port communicating with said nozzle return flow passage and an outlet port communicating with said inlet port and connected to said suction side of said pump, and a valving member mounted for rotation and for endwise movement in said housing and having a valve face portion adapted to sweep across and partially close said inlet port upon rotation of said cylindrical member.

8. In a system for intermittently injecting fuel into the combustion chambers of a multi-cylinder internal combustion engine, in combination, atomizing nozzles of the return flow type, one for each said combustion chamber, each said nozzle having communicating fuel inlet and fuel return passages and a fuel discharge orifice communicating with said passages and opening into the associated combustion chamber, means to supply fuel under pressure to said fuel inlets continuously, a return flow system connecting said fuel return passages to said supply source, and means to sequentially decrease the return flow through said return passages.

9. A system as defined in claim 8 including means to regulate said return flow decrease.

10. In a multiple outlet intermittent discharge fuel supply system, a plurality of atomizing nozzles of the return flow type, each said nozzle having a fuel inlet and alternative fuel outlets communicating with said fuel inlet, one of said outlets in each said nozzle comprising a discharge orifice and the other of said outlets comprising a return flow passage for conducting fuel back out of said nozzle, each said passage being adapted and dimensioned to conduct away from its nozzle all of the fuel supplied thereto and thereby prevent fuel discharge through the associated orifice, continuous-flow fuel supply means connected to said fuel inlets to supply fuel to said nozzles, a return flow system connecting said return flow passages back to said fuel supply means, said return flow system including a control valve for controlling the flow through said passages, said control valve comprising a hollow housing having in the walls thereof an outlet port and a plurality of inlet ports communicating with said outlet port and connected one to each said passage, and a valving member mounted for rotation in said housing and having a valve face portion adapted to sweep sequentially across said inlet ports as said valving element is rotated to at least partially close said inlet ports as said land sweeps thereacross.

11. In a fuel supply system, in combination, an atomizing nozzle of the return flow type having an inlet and alternative outlets, said outlets comprising a return flow passage and a fuel discharge orifice both communicating with said inlet, fuel supply means including a pump connected to said inlet to supply fuel to said nozzle, a fuel return system including said return flow passage connected to conduct fuel from said nozzle back to said supply means on the suction side of said pump, said return system being dimensioned and arranged to conduct away from said nozzle all of the fuel supplied to said nozzle, and a normally open valve in said return system adapted to intermittently partially close to decrease the fuel flow through said return system and thereby cause intermittent discharge from said orifice, said valve comprising a hollow housing having a valving element rotatably mounted therein, a port in the wall of said housing, and means associated with said valving element for intermittently partially covering said port upon rotation of said valving element.

12. In a fuel supply system, in combination, an atomizing nozzle of the return flow type having an inlet and alternative outlets, said outlets comprising a return flow passage and a fuel discharge orifice both communicating with said inlet, continuous-flow fuel supply means connected to said inlet passage to supply fuel to said nozzle, a fuel return system including said return flow passage connected to conduct fuel from said nozzle back to said supply means, and valve means associated with said return system to intermittently decrease by a variable amount the fuel flow through said return system to cause intermittent discharge from said orifice, said valve means comprising a hollow cylindrical housing having a port in the wall thereof connected to said return flow passage, a cylindrical valving element mounted for rotation and for longitudinal movement in said housing, said valving element having a lateral groove extending around the surface thereof to communicate with said port, said grooving being interrupted by a land means adapted to sweep across said port as said valving element rotates, an outlet port in said housing, grooving on the inside surface of said housing communicating said lateral groove with said outlet port, and means for effecting independent rotational and endwise movement of said valving element.

13. A system as defined in claim 12 wherein said port opens into the inside of said housing as an elongated slot, the relative orientation and dimensions of said slot and of said land being such as to simultaneously vary the duration and timing of said intermittent discharge as said valving element is moved endwise in said housing.

14. A system as defined in claim 12 wherein said port opens into the inside of said housing as an elongated slot parallel to the axis of said housing, and said land is shaped to cover a varying amount of said slot in sweeping thereacross.

15. A system as defined in claim 12 wherein said port opens into the inside of said housing as an elongated slot extending lengthwise of said housing, and wherein the dimension of said land in the direction of rotational travel thereof is several times the width of said slot.

16. A control valve for controlling the flow of liquid through a plurality of conduits, said control valve comprising a hollow cylindrical housing having a plurality of ports in the walls thereof connected one to each said conduit, a valving element mounted for rotation and for endwise movement in said housing, said valving element having a lateral groove extending around the surface thereof to communicate with said ports, said groove being interrupted by a land adapted to sweep sequentially across said ports as said cylindrical element is rotated to at least partially close said ports as said land sweeps across said ports, an outlet port in said housing, the dimension of said land in the direction of rotational travel being greater than the corresponding dimension of each said port, and grooving on the inside surface of said housing communicating said lateral groove with said outlet port.

17. A valve as defined in claim 16 wherein said ports open into the inside of said housing as elongated slots extending generally endwise in said housing, and wherein the width of each said slot varies from end to end thereof.

References Cited in the file of this patent

UNITED STATES PATENTS

| | | |
|---|---|---|
| 1,252,254 | Fisher | Jan. 1, 1918 |
| 2,087,296 | Parsons | July 20, 1937 |
| 2,102,485 | Riegels | Dec. 14, 1937 |
| 2,141,428 | Carroll | Dec. 27, 1938 |
| 2,347,363 | Palumbo | Apr. 25, 1944 |
| 2,607,207 | Branson | Aug. 19, 1952 |

FOREIGN PATENTS

| | | |
|---|---|---|
| 867,578 | France | Aug. 11, 1941 |
| 558,092 | Great Britain | Dec. 21, 1943 |

OTHER REFERENCES

Serial No. 394,323, Gosslau et al. (A. P. C.), published May 25, 1943.